United States Patent
Zhang et al.

(10) Patent No.: US 7,723,449 B2
(45) Date of Patent: May 25, 2010

(54) CATALYSTS FOR SYNTHESIZING A POLYPROPYLENE WITH A WIDE MOLECULAR WEIGHT DISTRIBUTION AND USE OF THE SAME

(75) Inventors: Chunyu Zhang, Changchun (CN); Hongguang Cai, Changchun (CN); Bin Chen, Changchun (CN); Yuping Yuan, Changchun (CN); Qiaofeng Zhang, Changchun (CN); Weimin Dong, Changchun (CN); Xuequan Zhang, Changchun (CN)

(73) Assignee: Changchun Institute of Applied Chemistry Chinese Academy of Sciences, Changchun (CN)

( * ) Notice: Subject to any disclaimer, the term of this patent is extended or adjusted under 35 U.S.C. 154(b) by 42 days.

(21) Appl. No.: 12/217,389

(22) Filed: Jul. 3, 2008

(65) Prior Publication Data

US 2009/0023881 A1 Jan. 22, 2009

(30) Foreign Application Priority Data

Jul. 19, 2007 (CN) .......................... 2007 1 0055884

(51) Int. Cl.
*C08F 4/42* (2006.01)
*C08F 110/06* (2006.01)

(52) U.S. Cl. ................ 526/124.8; 526/124.3; 526/107; 526/125.1; 526/351; 502/103; 502/121

(58) Field of Classification Search .............. 526/124.8, 526/124.3, 107, 125.1, 351; 502/103, 121
See application file for complete search history.

(56) References Cited

U.S. PATENT DOCUMENTS 6,635,734 B2 * 10/2003 Shamshoum et al. ........ 526/351

FOREIGN PATENT DOCUMENTS

| CN | 85101997 A | 7/1986 |
|---|---|---|
| CN | 1156999 A | 8/1997 |
| CN | 1137156 C | 2/2004 |
| EP | 1 083 187 A1 * | 3/2001 |

* cited by examiner

*Primary Examiner*—Ling-Siu Choi
(74) *Attorney, Agent, or Firm*—Wells St. John P.S.

(57) ABSTRACT

The present invention relates to a catalyst for synthesizing a polypropylene with a wide molecular weight distribution and use of the same. The catalyst comprises magnesium halide, titanium-containing compound, and an organic phosphate type electron donor compound. By the catalyst according to the present invention, a propylene polymer with a wide molecular weight distribution, easily controllable isotacticity and good processing properties can be synthesized.

11 Claims, No Drawings

CATALYSTS FOR SYNTHESIZING A POLYPROPYLENE WITH A WIDE MOLECULAR WEIGHT DISTRIBUTION AND USE OF THE SAME

TECHNICAL FIELD

The present invention relates to a catalyst for synthesizing a polypropylene with a wide molecular weight distribution, and use of the same.

BACKGROUND ART

It is well known that, for isotactic polypropylene, the higher its isotacticity, the higher the crystallinity of the corresponding products. As a result, the mechanical properties such as hardness, rigidity, modulus, break strength and yield strength or the like are relatively good, and accordingly, the melting point, the thermal stability, aging resistance of the polymer are also relatively outstanding, however, the properties such as toughness, impact resistance, extension at break or the like will somewhat drop. The higher the isotacticity of the polypropylene, the narrower the molecular weight distribution and less benefitting the processing application and more difficult for injection molding and orientative film forming.

The methods for improving the processing properties of polypropylene include adjusting the isotacticity of polypropylene (e.g. Chinese Patent CN85101997) and widening the molecular weight distribution of polypropylene. As to product with wide molecular weight distribution, its fractions with high molecular weight provide good impact strength, modulus, melt strength and thermal property; and its fractions with low molecular weight provide processing flowability. Therefore, for polypropylene resins with the same grade number, polypropylene with wide molecular weight distribution has better rigidity, toughness and processing behavior, and has outstanding advantage in producing extrusion or injection molding article. Chinese Patent Application CN1156999A and Chinese Patent CN1137156C employed the method of mixing electron donor to adjust the molecular weight distribution of the polymers, while widened the molecular weight distribution, it increased the processing complexity, and accordingly, also increased production costs.

SUMMARY OF THE INVENTION

This invention employs a catalyst for synthesizing a polypropylene with a wide molecular weight distribution. By using organic phosphate type compounds as internal electron donors, the object of preparing polypropylene with wide molecular weight distribution by single electron donor catalyst was realized, and the catalyst synthetic process and production costs were simplified and reduced. The disadvantage brought about by mixing electron donors was overcome.

The object of the present invention is to provide a catalyst for synthesizing a polypropylene with a wide molecular weight distribution comprising magnesium halide, a titanium-containing compound and an organic phosphate type electron donor compound. Polypropylene polymer with relatively wide molecular weight distribution, easily controllable polymer isotacticity and good processing properties can be synthesized.

This invention provides a catalyst for synthesizing a polypropylene with a wide molecular weight distribution comprising magnesium halide, a titanium-containing compound and an organic phosphate type electron donor compound. The molar ratios of the components are as follows: per mole magnesium halide, the addition amount of the titanium-containing compound in terms of metal Ti is 0.5-150 mol, preferably 1-20 mol; the addition amount of the organic phosphate type electron donor compound is 0.02-0.40 mol, preferably 0.05-0.20 mol.

Suitable magnesium halide includes but not limited to: magnesium dihalides, complexes of magnesium dihalide with water or alcohols, derivatives wherein a halogen atom in the molecular formula of magnesium dihalide was replaced by a hydrocarbyl group or a haloalkoxy group; said magnesium dihalide is selected from a group consisting of magnesium dichloride, magnesium dibromide, and magnesium diiodide. Among them, magnesium dichloride is preferred.

Said titanium-containing compound is a liquid titanic (4 valent) compound with the general formula of $TiX_n(OR)_{4-n}$, wherein, n is an integer from 1 to 4; X represents a halogen; R represents a $C_1$-$C_4$ alkyl group. Said titanium-containing compound is preferably selected from a group consisting of titanium tetrachloride, titanium tetrabromide, titanium tetraiodide, titanium tetrabutoxide, titanium tetraethoxide, titanium monochlorotriethoxide, titanium dichlorodiethoxide, and titanium trichloromonoethoxide. Among them, titanium tetrachloride is more preferred.

The general formula of the organic phosphate type electron donor compound is as follows:

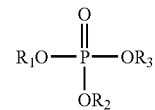

Wherein, the groups $R_1$, $R_2$ or $R_3$ are identical or different and each of them independently represents a $C_1$-$C_{20}$ linear or branched alkyl group, aryl group, alkoxyaryl group, or alkylaryl group.

Examples of said organic phosphate type electron donor compounds include but not limited to: trimethyl phosphate, triethyl phosphate, tributyl phosphate, triphenyl phosphate, tritolyl phosphate, triisopropylphenyl phosphate, tritertbutylphenyl phosphate, trimethoxylphenyl phosphate, phenyldimethyl phosphate, phenyldiethyl phosphate, phenyldibutyl phosphate, tolyldimethyl phosphate, tolyldiethyl phosphate, tolyldibutyl phosphate, isopropylphenyldimethyl phosphate, isopropylphenyldiethyl phosphate, isopropylphenyldibutyl phosphate, tertbutylphenyldimethyl phosphate, tertbutylphenyldiethyl phosphate, tertbutylphenyldibutyl phosphate, phenylditolyl phosphate, phenyldiisopropylphenyl phosphate, phenylditertbutylphenyl phosphate, tolyldiphenyl phosphate, tolyldiisopopylphenyl phosphate, tolylditertbutylphenyl phosphate, isopropylphenylditolyl phosphate, isopropylphenyldiphenyl phosphate or isopropylphenylditertbutylphenyl phosphate.

Among them, triphenyl phosphate and tritolyl phosphate are more preferred.

The steps and conditions for the preparation method of a catalyst for synthesizing a polypropylene with wide molecular weight distribution are as follows:

CN85100997 can be taken as reference. Briefly, the catalyst can be obtained by a process comprising the following steps:

(1) The Preparation of Magnesium Halide Solution

A uniform solution was formed by dissolving magnesium halides into the solvent system composed of organic epoxy compounds and organic phosphorous compounds at a dissolution temperature of 0-100° C., preferably 30-70° C. During the dissolution, one or more inert diluting agent selected from a group consisting of hexane, heptane, octane, toluene, xylene, chlorobenzene, and other hydrocarbon type or halohydrocarbon type compounds can be added. The ratios between each component, in terms of per mole magnesium halide, are as follows: the organic epoxy compound is 0.2-10 mol, preferably 0.5-4 mol; and the organic phosphorous compound is 0.1-3 mol, preferably 0.3-1.0 mol, thus magnesium halide solution was obtained.

Said organic epoxy compounds include the oxides, glycidyl ethers, inner ethers or the like of aliphatic olefins or dialkenes or of haloaliphatic olefins or dialkenes which have 2-8 carbon atoms. The examples of specific compounds include but not limited to: ethylene oxide, propylene oxide, butylene oxide, butadiene oxide, butadiene dioxide, epoxy chloropropane, methylglycidyl ether, diglycidyl ether or tetrahydrofuran. Among them, epoxy chloropropane is more preferable.

Said organic phosphorous compounds include alkyl esters or haloalkyl esters of orthophosphoric acid and of phosphorous acid, and the specific compounds include but not limited to: trimethyl orthophosphate, triethyl orthophosphate, tributyl orthophosphate, triphenyl orthophosphate, trimethyl phosphite, triethyl phosphite, tributyl phosphite or benzyl phosphite. Among them, tributyl orthophosphate is preferred.

(2) Precipitation of the Solid

At the low temperature in a range from 0 to −40° C., in the presence of coprecipitator in the reaction system, liquid titanic compound was mixed with magnesium halide solution, and a solid was precipitated as the temperature of the reaction system was gradually increased. Organic phosphate type electron donor compound can be added before or after the precipitation of the solid. The ratios between each component are, in terms of per mole magnesium halide, as follows: liquid titanic compound is 0.5-150 mol, preferably 1-20 mol; and coprecipitator is 0.03-1.0 mol, preferably 0.05-0.4 mol.

Said coprecipitator was selected from a group consisting of organic acids, organic acid anhydrides, organic ethers, organic ketones, or the mixtures thereof. The examples of specific compounds can be listed as follows: acetic anhydride, phthalic anhydride, succinic anhydride, maleic anhydride, 1,2,4,5-benzene tetracarboxylic acid dianhydride, acetic acid, propanoic acid, butyric acid, acrylic acid, methacrylic acid, acetone, methyl ethyl ketone, diphenyl ketone, methyl ether, ethyl ether, propyl ether, butyl ether or amyl ether. Among them, phthalic anhydride is preferred.

(3) Treatment and Washing of the Solid Precipitate

The solid precipitate described above was treated by titanium tetrahalide or the mixture of titanium tetrahalide and inert diluting agent, and subsequently washed with inert diluting agent. Thus, a catalyst for synthesizing a polypropylene with wide molecular weight distribution was obtained.

This invention provides a catalyst for synthesizing a polypropylene with a wide molecular weight distribution. In addition to the present catalyst, it is needed to add a cocatalyst and an external electron donor during the polymerization.

Said cocatalyst may be an alkylaluminium compound with the general formula of $AlR_nX_{3-n}$, wherein R represents hydrogen or alkyl groups with the carbon number of 1-20; X represents halogen, especially chlorine or bromine; and n represents an integer of $0 < n \leq 3$.

The specific alkylaluminium compounds include but not limited to: aluminium trimethyl, aluminium triethyl, aluminium triisobutyl, aluminium monohydrobiethyl, aluminium monohydrobiisobutyl, aluminium monochlorobiethyl, aluminium monochlorobiisobutyl, aluminium sesquiethyl chloride or aluminium bichloroethyl. Among them, aluminium triethyl or aluminium triisobutyl is preferred.

Said external electron donors are organic silicon compounds with the general formula of $R_nSi(OR)_{4-n}$, wherein $0 \leq n \leq 3$, n is an integer; R and R' are identical or different alkyl groups, cycloalkyl groups, aryl groups or haloalkyl groups.

The examples of specific organic silicon compounds include but not limited to: trimethylmethoxy silicane, trimethylethoxy silicane, bimethylbimethoxy silicane, bimethylbiethoxy silicane, methylcyclohexylbimethoxy silicane, bibutylbimethoxy silicane or biphenylbimethoxy silicane. Among them, methylcyclohexylbimethoxy silicane, bibutylbimethoxy silicane and biphenylbimethoxy silicane are preferred.

The proportion of said aluminium alkyl to the catalyst is (5-1000):1 in terms of the molar ratio of aluminium and titanium, preferably (100-800):1; and the proportion of the aluminium alkyl to external electron donors is (1-400):1 in terms of the molar ratio of aluminium and silicon, preferably (25-250):1.

Use of the catalyst for synthesizing a polypropylene with wide molecular weight distribution can be described as follows.

The catalyst for synthesizing a polypropylene with wide molecular weight distribution according to this invention can particularly be used for the homopolymerization of propylene and the copolymerization of propylene and other α-olefin(s). The polymerization can be a liquid-phase polymerization or a vapour-phase polymerzation.

The catalyst for synthesizing a polypropylene with wide molecular weight distribution according to this invention can also be used for the polymerization or the copolymerization of α-olefins having 2-20 carbon atoms, especially for the homopolymerization or copolymerization of ethylene, 1-butylene, 4-methyl-1-amylene, 1-hexene, 3-methyl-1-butylene, 1-decene, 1-tetradecene or 1-eicosylene.

Advantageous Effect

By adjusting internal electron donors, the catalyst according to this invention can be used to synthesize propylene polymer with a relatively high and easily adjustable isotacticity and a molecular weight distribution with a medium width. Especially for the catalyst system described by CN85100997, by using phosphates as internal electron donor compounds, the resulted propylene polymer has an easily adjustable isotacticity and a widened molecular weight distribution, which benefits the development of many kinds of polypropylenes.

When the catalysts according to this invention were used for the polymerization of propylene, for example, if adjusting Al/Si (mol/mol) from 25 to 100, the isotacticity of polypropylene will be reduced from 98% to 90%, and the molecular weight distribution thereof will also be widened.

DETAILED DESCRIPTION OF THE EMBODIMENTS

Due to the multi-complex groups and complex structure, the organic phosphate type electron donor compounds according to this invention make the environment of the active center change. The active centers in different environments have different sensitivities to hydrogen. Therefore, when hydrogen is used as molecular weight control agent, different molecular weights are produced, thus polypropylene with a wide molecular weight distribution is obtained.

EXAMPLE 1

The Preparation of a Catalyst for Synthesizing a Polypropylene with Wide Molecular Weight Distribution The preparation of catalyst components:

To a reactor which have been sufficiently purged by high-purity nitrogen, 0.05 mol anhydrous $MgCl_2$, 95 ml toluene, 0.05 mol epoxy chloropropane (ECP) and 0.046 mol tributyl phosphate (TBP) were added in this order. Raised the temperature to 50° C. under stirring, and kept it for 2.5 h. The solids were dissolved completely, then 0.0095 mol phthalic anhydride was added. The temperature was kept for 1 h, then the solution was cooled to −25° C., and 56 ml $TiCl_4$ was added dropwise over 1 h. The temperature was gradually raised to 80° C. while a solid was precipitated. 0.0027 mol triphenyl phosphate was added and the reactor was kept at 80° C. for 1 h. After filtration, a washing was made twice with 100 ml toluene, and a brown yellow solid precipitate was obtained. Then 60 ml toluene, and 40 ml $TiCl_4$ were added. The washed precipitate was treated at 90° C. for 2 h. After removing the filtrate, the treatment was repeated once more. After washing with 100 ml toluene for 3 times and with 100 ml hexane for 2 times, a catalyst for synthesizing a polypropylene with a wide molecular weight distribution was obtained. In this catalyst, the weight of titanium is 2.5 wt %, the weight of magnesium is 17.10 wt %, and the weight of chlorine is 54.03 wt %.

Polymerization of Propylene

In a 5 L stainless steel autoclave which has been sufficiently purged by propylene, 0.4 ml $AlEt_3$, and 0.004 ml methylcyclohexylbimethoxy silicane were added to make Al/Si (mol/mol)=25. 10 mg catalyst of this invention produced as above, and 800 g propylene were also added. The reaction was carried out at 70° C. for 2 h. Then the temperature was dropped, the pressure was reduced, and a polypropylene (PP) resin was obtained. The results were shown in Table 1.

COMPARATIVE EXAMPLE

The Preparation of a Catalyst Comprising Bibutyl Phthalic Ester as Internal Electron Donor To a reactor which have been sufficiently purged by high-purity nitrogen, 0.05 mol anhydrous $MgCl_2$, 95 ml toluene, 0.05 mol epoxy chloropropane (ECP) and 0.046 mol tributyl phosphate (TBP) were added in this order. The temperature was raised to 50° C. under stirring and kept for 2.5 h, the solids were dissolved completely, then 0.0095 mol bimethyl phthalic ester was added, the temperature was kept for additional 1 h, then the solution was cooled to −25° C., 56 ml $TiCl_4$ was added dropwise over 1 h. The temperature was raised to 80° C. gradually while a solid was precipitated gradually. 0.0056 mol bibutyl phthalic ester was added and the reactor was kept at 80° C. for 1 h. After filtration, a washing was made twice with 100 ml toluene, and a brown yellow solid precipitate was obtained. Then 60 ml toluene and 40 ml $TiCl_4$ were added to treat the precipitate at 90° C. for 2 h, after removing the filtrate, the treatment was repeated once more. The treated precipitate was washed with 100 ml toluene for 3 times and 100 ml hexane for 2 times, and finally a catalyst comprising bibutyl phthalic ester as internal electron donor was obtained. The results were shown in Table 1.

Polymerization of Propylene

In a 5 L stainless steel autoclave which has been sufficiently purged by propylene, 0.4 ml $AlEt_3$ and 0.004 ml methylcyclohexylbimethoxy silicane (CHMMS) were added to make Al/Si ratio (mol/mol)=25, and 10 mg catalyst of comparative example, 800 g propylene were also added. The reaction was carried out at 70° C. for 2 h, the temperature was dropped, the pressure was reduced, and a PP resin was obtained. The results were shown in Table 1.

EXAMPLE 2

Except that triphenyl phosphate in Example 1 was changed to tributyl phosphate, Example 2 was carried out at the same way as Example 1. The results were shown in Table 1.

EXAMPLE 3

Except that triphenyl phosphate in Example 1 was changed to tritolyl phosphate, Example 3 was carried out at the same way as Example 1. The results were shown in Table 1.

EXAMPLE 4

Except that triphenyl phosphate in Example 1 was changed to phenyldibutyl phosphate, Example 4 was carried out at the same way as Example 1. The results were shown in Table 1.

EXAMPLE 5

Except that triphenyl phosphate in Example 1 was changed to trimethoxylphenyl phosphate, Example 5 was carried out at the same way as Example 1. The results were shown in Table 1.

EXAMPLE 6-51

Except that the internal electron donors were changed, Examples 6-51 were carried out at the same way as Example 1 by using the catalyst of Example 1. The results were shown in Table 1.

EXAMPLE 52, 53

Except that the addition amount of methylcyclohexylbimethoxy silicane was changed to adjust the molar ratio of aluminium and silicon to be 70 (Example 52) and 100 (Example 53), Examples 52-53 were carried out at the same way as Example 1 by using the catalyst of Example 1. The results were shown in Table 2.

EXAMPLE 54, 55

Except that the catalyst of Example 3 was used, and the addition amounts of methylcyclohexylbimethoxy silicane was changed to adjust the molar ratio of aluminium and silicon to be 70 (Example 54) and 100 (Example 55), Examples 54-55 were carried out in the same way as Example 1. The results were shown in Table 2.

TABLE 1

Activities, isotacticities and molecular weight distributions of catalysts containing different internal electron donor compounds

| | Electron donor compounds | molecular weight distribution Mw/Mn | Activity kgPP/g · cat | Isotacticity I.I % | Apparent Density g/cm³ |
|---|---|---|---|---|---|
| Example 1 | triphenyl phosphate | 9.0 | 31.2 | 97.9 | 0.46 |
| Example 2 | tributyl phosphate | 8.5 | 30.0 | 96.1 | 0.43 |
| Example 3 | tritolyl phosphate | 9.3 | 33.42 | 98.2 | 0.45 |
| Example 4 | phenyldibutyl phosphate | 8.2 | 29.8 | 98.3 | 0.43 |
| Example 5 | trimethoxylphenyl phosphate | 7.9 | 22.4 | 94.1 | 0.39 |
| Comparative Example | biisobutyl phthalic ester | 4.8 | 42.0 | 98.3 | 0.45 |
| Example 6 | trimethyl phosphate | 7.2 | 31.2 | 95.6 | 0.42 |
| Example 7 | triethyl phosphate | | 30.5 | 95.9 | 0.42 |
| Example 8 | tri-p-isopropyl phenyl phosphate | 8.6 | 29.8 | 98.0 | 0.42 |
| Example 9 | tri-p-t-butylphenyl phosphate | 7.4 | 28.6 | 98.2 | 0.43 |
| Example 10 | tri-p-methoxyl phenyl phosphate | 7.9 | 22.4 | 94.1 | 0.39 |
| Example 11 | phenylbimethyl phosphate | | 30.5 | 98.2 | 0.43 |
| Example 12 | phenylbiethyl phosphate | | 30.0 | 98.3 | 0.44 |
| Example 13 | biphenylmethyl phosphate | | 32.5 | 97.2 | 0.43 |
| Example 14 | biphenylethyl phosphate | | 31.9 | 98.0 | 0.45 |
| Example 15 | biphenylbutyl phosphate | 8.9 | 30.7 | 98.2 | 0.46 |
| Example 16 | p-tolylbimethyl phosphate | | 31.2 | 98.5 | 0.44 |
| Example 17 | p-tolylbiethyl phosphate | 8.3 | 31.0 | 98.6 | 0.43 |
| Example 18 | p-tolylbibutyl phosphate | 8.5 | 30.8 | 98.8 | 0.43 |
| Example 19 | o-tolylbimethyl phosphate | | 26.8 | 97.9 | 0.43 |
| Example 20 | o-tolylbiethyl phosphate | 7.1 | 26.5 | 98.2 | 0.44 |
| Example 21 | o-tolylbibutyl phosphate | | 26.0 | 97.5 | 0.43 |
| Example 22 | m-tolylbimethyl phosphate | | 28.5 | 98.5 | 0.42 |
| Example 23 | m-tolylbiethyl phosphate | 7.4 | 28.3 | 98.6 | 0.42 |
| Example 24 | m-tolylbibutyl phosphate | 7.8 | 28.0 | 98.8 | 0.44 |
| Example 25 | p-bitolylmethyl phosphate | | 33.0 | 97.2 | 0.44 |
| Example 26 | p-bitolylethyl phosphate | | 32.5 | 98.0 | 0.43 |
| Example 27 | p-bitolylbutyl phosphate | 7.5 | 32.2 | 98.4 | 0.44 |
| Example 28 | o-bitolylmethyl phosphate | | 31.2 | 96.5 | 0.42 |
| Example 29 | o-bitolylethyl phosphate | | 30.1 | 97.0 | 0.45 |
| Example 30 | o-bitolylbutyl phosphate | | 29.4 | 97.5 | 0.44 |
| Example 31 | m-bitolylmethyl phosphate | 6.9 | 30.1 | 95.2 | 0.42 |
| Example 32 | m-bitolylethyl phosphate | | 29.4 | 96.5 | 0.43 |
| Example 33 | m-bitolylbutyl phosphate | | 28.1 | 97.0 | 0.43 |

TABLE 1-continued

Activities, isotacticities and molecular weight distributions of catalysts containing different internal electron donor compounds

| | Electron donor compounds | molecular weight distribution Mw/Mn | Activity kgPP/g · cat | Isotacticity I.I % | Apparent Density g/cm³ |
|---|---|---|---|---|---|
| Example 34 | p-isopropylphenyldimethyl phosphate | | 32.5 | 99.0 | 0.43 |
| Example 35 | p-isopropylphenyldiethyl phosphate | 7.3 | 32.2 | 98.9 | 0.42 |
| Example 36 | p-isopropylphenyldibutyl phosphate | 6.9 | 31.9 | 98.7 | 0.43 |
| Example 37 | p-biisopropylphenylmethyl phosphate | | 32.8 | 97.5 | 0.45 |
| Example 38 | p-biisopropylphenylethyl phosphate | 8.2 | 31.2 | 98.1 | 0.44 |
| Example 39 | p-biisopropylphenylbutyl phosphate | | 30.9 | 98.3 | 0.45 |
| Example 40 | p-t-butylphenylbimethyl phosphate | 7.0 | 33.6 | 99.1 | 0.42 |
| Example 41 | p-t-butylphenylbiethyl phosphate | | 33.3 | 99.0 | 0.42 |
| Example 42 | p-t-butylphenylbibutyl phosphate | 7.3 | 33.0 | 99.0 | 0.43 |
| Example 43 | phenyl-p-bitolyl phosphate | | 30.4 | 97.5 | 0.41 |
| Example 44 | phenyl-p-biisopropylphenyl phosphate | 7.4 | 28.4 | 97.6 | 0.42 |
| Example 45 | phenyl-p-bi-t-butylphenyl phosphate | 7.6 | 27.6 | 97.8 | 0.42 |
| Example 46 | p-tolylbiphenyl phosphate | 7.3 | 29.8 | 96.8 | 0.44 |
| Example 47 | m-tolyl-p-bi-t-butylphenyl phosphate | 7.3 | 28.6 | 98.9 | 0.44 |
| Example 48 | p-isopropylphenyl-p-bitolyl phosphate | 7.6 | 27.2 | 98.0 | 0.42 |
| Example 49 | p-isopropylphenyl-o-bitolyl phosphate | | 26.0 | 97.4 | 0.43 |
| Example 50 | p-isopropylphenyl-m-bitolyl phosphate | | 27.0 | 97.3 | 0.45 |
| Example 51 | p-isopropylphenyl-p-biphenyl phosphate | 7.0 | 27.2 | 98.1 | 0.42 |

TABLE 2

The activities of the catalysts with different silicon/aluminium ratios and isotacticities of the polymers

| Examples | Electron donor | Al/Si (mol) | Activity kgPP/g · cat | Isotacticity I.I % | Apparent Density g/cm³ |
|---|---|---|---|---|---|
| Example 1 | triphenyl phosphate | 25 | 31.2 | 97.9 | 0.46 |
| Example 52 | triphenyl phosphate | 70 | 32.1 | 96.5 | 0.45 |
| Example 53 | triphenyl phosphate | 100 | 34.1 | 94.2 | 0.44 |
| Example 3 | tritolyl phosphate | 25 | 33.42 | 98.2 | 0.45 |
| Example 54 | tritolyl phosphate | 70 | 35.2 | 97.0 | 0.45 |
| Example 55 | tritolyl phosphate | 100 | 37.4 | 95.4 | 0.43 |

The invention claimed is:

1. A catalyst for synthesizing a polypropylene with a wide molecular weight distribution, the catalyst comprising magnesium halide, titanium-containing compound and an organic phosphate electron donor compound at the following molar ratios per mole magnesium halide; the proportion of titanium-containing compound being in terms of metal Ti is 0.5-150 mol; the proportion of organic phosphate electron donor compound is 0.02-0.40 mol;

said magnesium halide being at least one selected from a group consisting of magnesium dihalides, complexes of magnesium dihalide with water or alcohols, and derivatives of magnesium dihalides, wherein a halogen atom in the molecular formula of the magnesium dihalides is replaced by an alkyl group or a haloalkoxy group;

said titanium-containing compound being a liquid titanic compound with the general formula of $TiX_n(OR)_{4-n}$, wherein n is an integer from 1 to 4; each X represents a halogen; and each R represents a $C_1$-$C_4$ alkyl group;

the general formula of said organic phosphate electron donor compound being as follows:

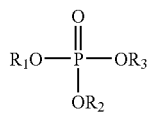

wherein $R_1$, $R_2$ and $R_3$ are the same or different from each other and each of them independently represents a group selected from a group consisting of $C_1$-$C_{20}$ linear or branched alkyl group, aryl group, alkoxyaryl group, and alkylaryl group.

2. A catalyst for synthesizing a polypropylene with a wide molecular weight distribution according to claim 1, wherein said magnesium dihalide is selected from a group consisting of magnesium dichloride, magnesium dibromide, and magnesium diiodide.

3. A catalyst for synthesizing a polypropylene with a wide molecular weight distribution according to claim 2, wherein said magnesium dihalide is magnesium dichloride.

4. A catalyst for synthesizing a polypropylene with a wide molecular weight distribution according to claim 1, wherein said liquid titanic compound is selected from a group consisting of titanium tetrachloride, titanium tetrabromide, titanium tetraiodide, titanium tetrabutoxide, titanium tetraethoxide, titanium monochlorotriethoxide, titanium dichlorodiethoxide, and titanium trichloromonoethoxide.

5. A catalyst for synthesizing a polypropylene with a wide molecular weight distribution according to claim 4, wherein said liquid titanic compound is titanium tetrachloride.

6. A catalyst for synthesizing a polypropylene with a wide molecular weight distribution according to claim 1, wherein said organic phosphate electron donor compound is at least one selected from a group consisting of trimethyl phosphate, triethyl phosphate, tributyl phosphate, triphenyl phosphate, tritolyl phosphate, triisopropylphenyl phosphate, tritertbutylphenyl phosphate, trimethoxylphenyl phosphate, phenyldimethyl phosphate, phenyldiethyl phosphate, phenyldibutyl phosphate, tolyldimethyl phosphate, tolyldiethyl phosphate, tolyldibutyl phosphate, isopropylphenyldimethyl phosphate, isopropylphenyldiethyl phosphate, isopropylphenyldibutyl phosphate, tertbutylphenyldimethyl phosphate, tertbutylphenyldiethyl phosphate, tertbutylphenyldibutyl phosphate, phenylditolyl phosphate, phenyldiisopropylphenyl phosphate, phenylditertbutylphenyl phosphate, tolyldiphenyl phosphate, tolyldiisopopylphenyl phosphate, tolylditertbutylphenyl phosphate, isopropylphenylditolyl phosphate, isopropylphenyldiphenyl phosphate, and isopropylphenylditertbutylphenyl phosphate.

7. A catalyst for synthesizing a polypropylene with a wide molecular weight distribution according to claim 1, wherein, per mole magnesium halide, the proportion of titanium-containing compound in terms of metal Ti is 1-20 mol.

8. A catalyst for synthesizing a polypropylene with a wide molecular weight distribution according to claim 1, wherein, per mole magnesium halide, the proportion of said organic phosphate electron donor compound is 0.05-0.20 mol.

9. A process for synthesizing a polypropylene with a wide molecular weight distribution, the process comprising:
providing one or more of the same or different α-olefins having 2-20 carbon atoms; and
exposing the α-olefins to the catalyst of claim 1 to homopolymerize and/or copolymerize the α-olefins.

10. The process according to claim 9, wherein during the exposing, one or both of the catalyst and the α-olefins are in liquid phase 11. The process according to claim 9, wherein the one or more of the α-olefins is selected from a group condidting of ethylene, 1-butylene, 4-methyl-1-amylene, 1-hexene, 3-methyl-1-amylene, 3-methyl-1-butylene, 1-decene, 1-tetradecene, or 1-eicosylene.

* * * * *

UNITED STATES PATENT AND TRADEMARK OFFICE
CERTIFICATE OF CORRECTION

PATENT NO. : 7,723,449 B2  Page 1 of 1
APPLICATION NO. : 12/217389
DATED : May 25, 2010
INVENTOR(S) : Zhang et al.

It is certified that error appears in the above-identified patent and that said Letters Patent is hereby corrected as shown below:

Column 2, Line 61 – Replace "CN85100997" with --CN85101997--.

Column 4, Line 50 – Replace "CN85100997" with --CN85101997--.

Column 12, Line 33 – Replace "condidting" with --consisting--.

Signed and Sealed this

Thirty-first Day of August, 2010

David J. Kappos
*Director of the United States Patent and Trademark Office*